June 8, 1965    J. R. MOOREHEAD    3,188,025
MEANS FOR TAKE-OFF, CRUISE, AND LANDING OF
SUBSONIC AND SUPERSONIC AIRCRAFT
Filed Aug. 29, 1963    3 Sheets-Sheet 1

INVENTOR.
JAMES R. MOOREHEAD
BY
Theron N. Nichols
AGENT

June 8, 1965  J. R. MOOREHEAD  3,188,025
MEANS FOR TAKE-OFF, CRUISE, AND LANDING OF
SUBSONIC AND SUPERSONIC AIRCRAFT
Filed Aug. 29, 1963  3 Sheets-Sheet 2

INVENTOR.
JAMES R. MOOREHEAD
BY
Theron H. Nichols
AGENT

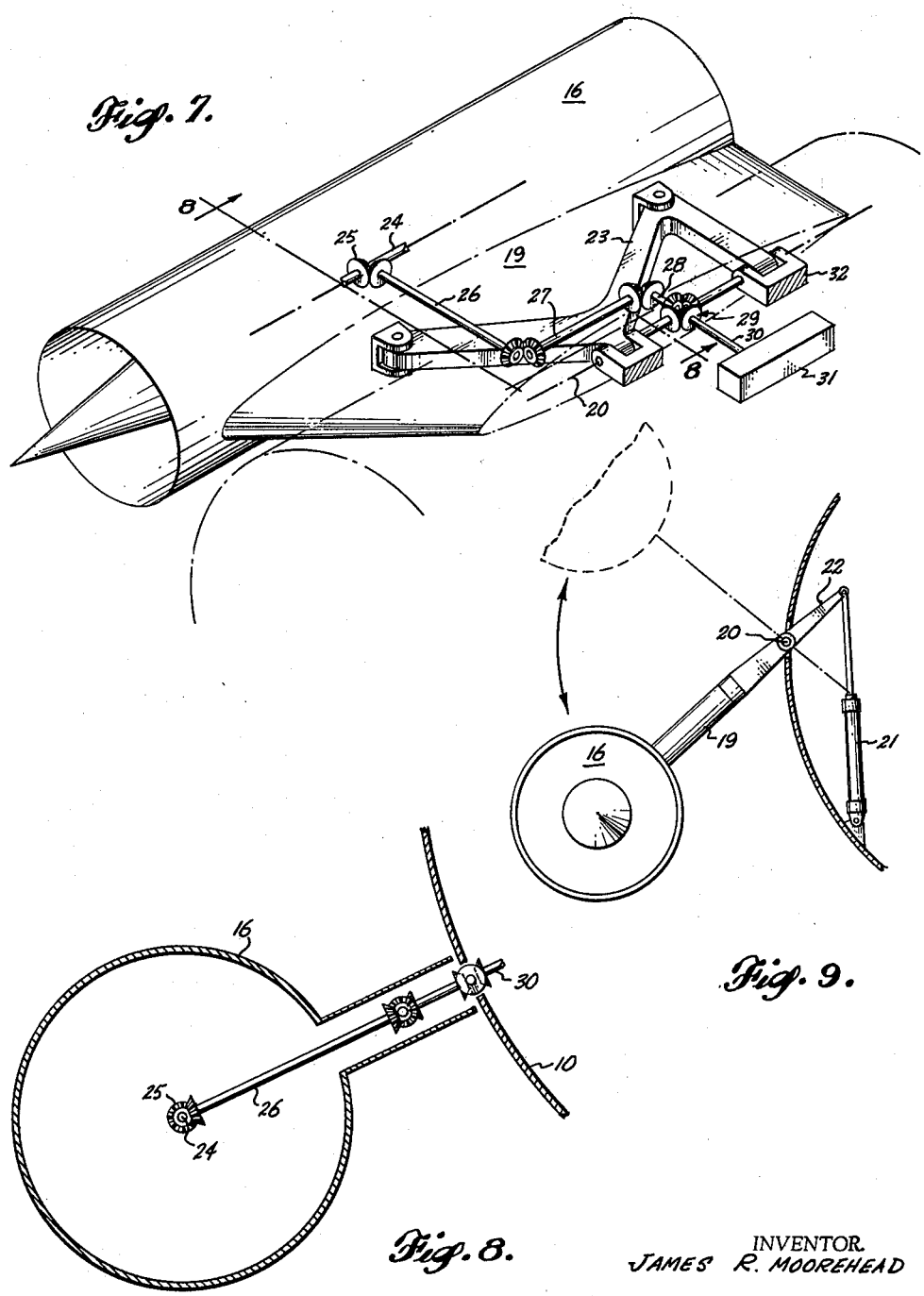

United States Patent Office 3,188,025
Patented June 8, 1965

3,188,025
MEANS FOR TAKE-OFF, CRUISE, AND LANDING OF SUBSONIC AND SUPERSONIC AIRCRAFT
James R. Moorehead, Bellevue, Wash., assignor to The Boeing Company, Seattle, Wash., a corporation of Delaware
Filed Aug. 29, 1963, Ser. No. 305,266
6 Claims. (Cl. 244—55)

This invention pertains to a method and to modifications of an aircraft for carrying out the method for take-off, cruise, and landing of subsonic and supersonic aircraft.

More particularly this invention comprises a new method for take-off, cruise, and landing of supersonic aircraft, and at least two embodiments of an aircraft for carrying out the method. The method comprises pivotally attaching engine mounted pylons to the fuselage for pivotal movement between a position where the engines are above the plane of the wings for take-off and landings and a position where the engines are below the plane of the wings for cruise flight.

Many problems are encountered in the design of the supersonic aircraft today. One problem is determination of the location of the position of the aircraft power plants or engines when desired between the vertical planes of the wings and tail. If the engines are positioned low on the aircraft where undisturbed air is available, then long, thin, bulky landing gears are required and foreign material as slush, exploding tires, and other flying debris may be ingested during take-offs and landings. Likewise, if the engines are permanently positioned high above the wings providing ingestion free air inlets for take-offs and landings are permitting short light landing gears, then during cruise flight the engine inlets are not operated in the best air flow field.

A primary object of this invention is to provide a method for operating fast aircraft in the two conditions, one condition with the power plants in the optimum position for take-offs and landings and the other condition with the power plants in the optimum position for transsonic and cruise flights.

Another object of this invention is to provide at least two embodiments of an aircraft for carrying out the method for operating aircraft, which method comprises providing a pivotal mounting of the aircraft power plant pods such that they are movable between the optimum position for take-off and landing and the optimum position for cruise flight.

A further object is to provide an aircraft with power plants pivotally mounted for movement between a position above the plane of the wing for take-off and landings and a position below the plane of the wing for cruise flight.

A still further object of this invention is to provide a swept wing aircraft having power plants pivotal about an axis substantially parallel to the aircraft longitudinal axis.

Another object of this invention is to provide an aircraft in which the horizontal stabilizers and elevators may be mounted low and contiguous with the fuselage without having to be raised out of reach of the engine exhausts and without having to be formed into a high thick T-tail.

Yet another object of this invention is to provide a swept wing aircraft having power plants pivotal about both an axis substantially parallel to the aircraft longitudinal axis and its transverser axis to maintain the thrust line close to the aircraft center of gravity for maximum efficiency of thrust.

Other objects and various advantages of the disclosed method and means for take-off and cruise of subsonic and supersonic aircraft will be apparent from the following detailed description, together with the accompanying drawings, submitted for purposes of illustration only and not intended to define the scope of the invention, reference being had for that purpose to the subjoined claims.

Briefly, this invention comprises as optimum method for take-offs, landings, and cruise flight of supersonic aircraft and at least two different embodiments for carrying out the method. The method comprises basically positioning at least one engine at the optimum position for take-off, which in the disclosed aircraft is above the plane of the wings, and for cruise flight, such as when the aircraft is intended to be flown faster than Mach 1 positioning the engine at the optimum position, which in the disclosed aircraft is below the plane of the wings, and returning the engine to the optimum position for landing above the plane of the wing.

One embodiment for carrying out the method comprises an engine mounted pylon pivotally mounted on each side of the fuselage for movement about an axis parallel to the aircraft longitudinal axis from a position above the plane of the wings for take-off and landings to a position below the wings for greater than Mach 1 cruise flight. A second embodiment has the engine mounted pylons pivotally mounted on a rearwardly and upwardly extending axis to provide, in effect, rotational movement of the engines about two axes simultaneously, one axis parallel to the aircraft longitudinal axis and the other axis parallel to the aircraft transverse axis to insure that the thrust axis passes close to or through the aircraft center of gravity.

The drawings diagrammatically illustrate by way of example, not by way of limitation a method and two forms of the invention wherein like reference numerals designate corresponding parts in the several views in which:

FIG. 7 is a detailed perspective schematic view of the accessories power take-off gearing;

FIG. 8 is a sectional view taken at 8—8 on FIG. 7 with parts deleted; and

FIG. 9 is a schematic front view of the engine position actuator with parts shown in section.

The invention disclosed herein is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

The new method comprises pivotally mounting the power plants on the aircraft, positioning them above the plane of the wings for take-off, positioning them below the plane of the wings for greater than Mach 1 cruise flight, and then positioning them above the plane of the wings for landings. The above term "plane of the wings" refers to the plane through the chords of the wing or substantially the horizontal plane through the wings.

Cruise flight speed with the disclosed invention is normally above Mach 1. If the flight plan calls for no flying faster than subsonic however, then the engines may be maintained in the take-off and landing (upper) position above the wings. However, when the flight plan calls for flying faster than Mach 1, as it usually does for a supersonic trip, then after take-off and when a speed of between Mach .3 and .4 is reached, the engines are throttled back to sustaining power consistent with airplane speed and altitude, lowered to the supersonic cruise position, and then their power resumed again in anticipation and preparation for reaching the normal supersonic or greater than Mach 1 cruise speed.

Then during letdown and in preparation for landing, when the speed drops to the range between Mach .3 and Mach .4, the engines, already in the idling condition are raised from the lowered cruise position to the upper landing position. Any power can now be applied consistent with any foreseeable approach, landing, go-around, or reverse condition.

Since titanium or a higher heat resistant material is used in the critical areas of all supersonic aircraft, heating of the horizontal tail surfaces is no problem. The principal reason for throttling of the engines momentarily while changing positions is to minimize the turbulent, buffeting, and noise effects of the exhaust gases over the tail surfaces. The above method enables a subsonic or particularly a supersonic, hypersonic, or faster aircraft to take off and land with the engines free of ingestion of foreign material, and permits shorter, lighter, and sturdier landing gears. Likewise this method ensures that the engines are operated at the best position, i.e., in undisturbed air or, at least, air of greater density. Also, maximum air consumption results at all attitudes of flight.

Two embodiments of an aircraft for carrying out the above described method are disclosed in FIGS. 1–3 and FIGS. 4–6.

Figure 1:
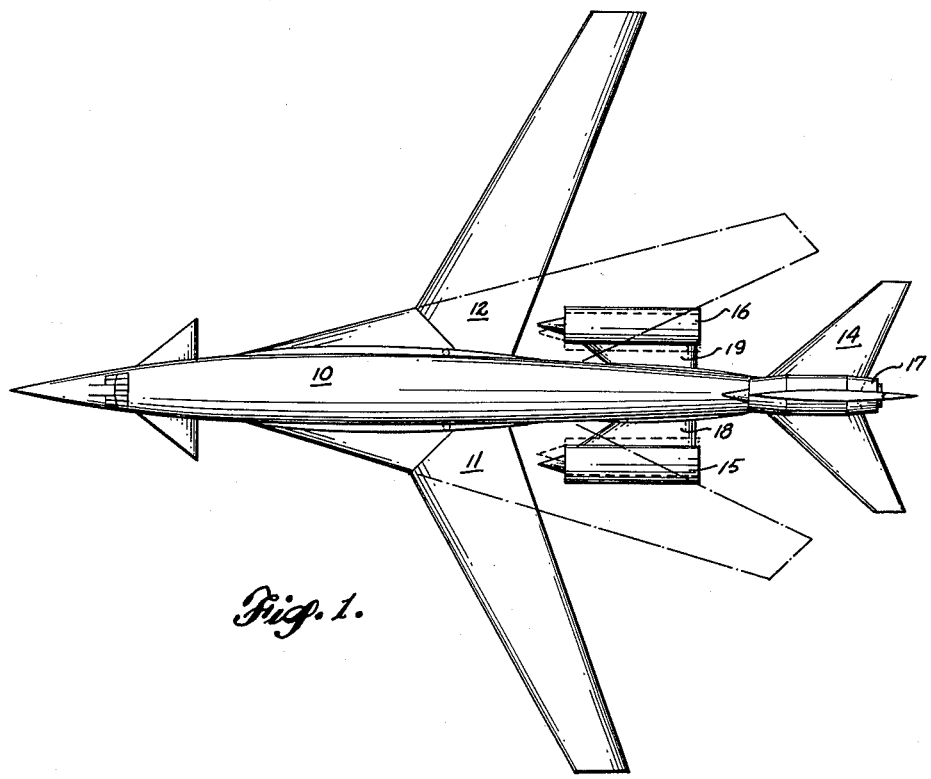
FIG. 1 is a schematic plan view of a swept wing aircraft with the pivotally mounted engines shown in the upper or take-off and landing position in solid lines and shown in the lower or cruise flight position in broken lines.
Figure 2:
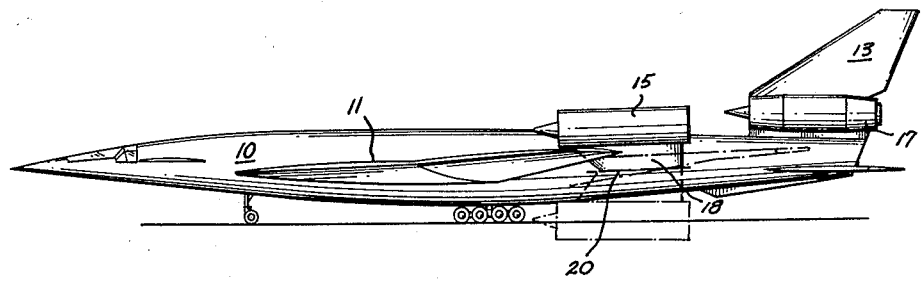
FIG. 2 is a side view of the aircraft of FIG. 1.
Figure 3:
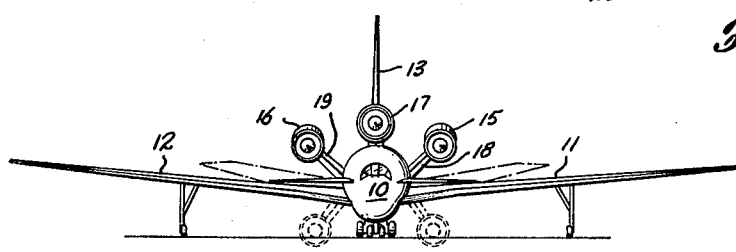
FIG. 3 is a front view of the aircraft of FIG. 1.

FIGS. 1–3 disclose the first embodiment of an aircraft having a fuselage 10, wings 11 and 12, rudder 13, elevator 14, and power plants or engines 15 and 16. The power plants are any suitable aircraft engines, such as but not limited to, turbo jet engines or ram jet engines. Additional features included in the aircraft are a third engine 17 in the empennage and variable swept wings, the wings illustrated in solid lines for take-off and landings and in broken lines for cruise flight. While the invention is preferred for use on supersonic aircraft, obviously it may also be utilized on subsonic or hypersonic aircraft, if so desired and designed therefor.

Engines 15 and 16 of FIG. 1 are fixedly mounted on the outer ends of their respective pylons 18 and 19. On the disclosed exemplary aircraft utilizing the invention, the inner ends of the pylons are pivotally attached to the fuselage 10 between the wings 11, 12 and the tail group 13, 14, on pylon pivot axis 20, FIG. 2. The principal feature of these embodiments being the movability of the engines to either the position above the plane of the wings or the position below the plane of the wings, the pylons are accordingly of sufficient length to so position the engines, noting FIGS. 2, 3, and 9.

For actuating the engines, as engine 16 for example, FIG. 9, between the two positions, an actuator, such as but not limited to, a hydraulic piston and cylinder motor 21 is connected to an extension 22 of pylon 19. The engines, pylon, and extension are illustrated in solid lines in the cruise position in FIG. 9 and illustrated in broken lines in the take-off and landing positions.

FIG. 7 discloses a supporting frame structure 23 internally of the pylon 19 and pivotally connected to the fuselage structure 32 along axis 20 for carrying the engine loads. A pivot on axis 20 is substantially parallel to the aircraft longitudinal axis. Likewise in each pylon is the accessories power take-off gearing as that shown in FIGS. 7 and 8 comprising a plurality of shafts in gear tooth engagement for driving the accessories box 31. More specifically, engine center shaft 24 has a gear 25 for driving three interconnected geared shafts 26, 27 and 28 respectively, the latter shaft being connected through an epicyclic gear train 29 to an input shaft 30 for driving the accessories box 31. A similar pylon structure is provided for the modification of FIGS. 4–6.

In operation of the embodiment of FIGS. 1–3 for carrying out the disclosed novel method, the actuators for each of the side mounted engines are actuated or contracted in the disclosed system to raise their respective engines to the position above the horizontal plane of the wings for take-off. With the engines so positioned the landing gear may be shorter, stronger, and lighter. Slush and flying debris are not ingested. The engines are therefore in optimum position for take-off. For at least supersonic or greater than Mach 1 cruise flight the actuators are operated or expanded to lower the engines below the horizontal plane of the wings. The engines are thus in the most favorable position for consumption of the air of greater density and or at least undisturbed air free of turbulence. The engines are then in optimum position for cruise.

Since each of the side mounted engines pivots about the pivot axis 20 which is substantially parallel to the aircraft longitudinal axis, the engines are substantially at the same angle of incidence at both of the extreme positions, that position for take-off or landing and that position for greater than Mach 1 cruise flight.

While a third or center engine 17, is illustrated in the tail group and preferred in the disclosed aircraft, the invention is not limited to, nor requires, the third engine.

Figure 4:
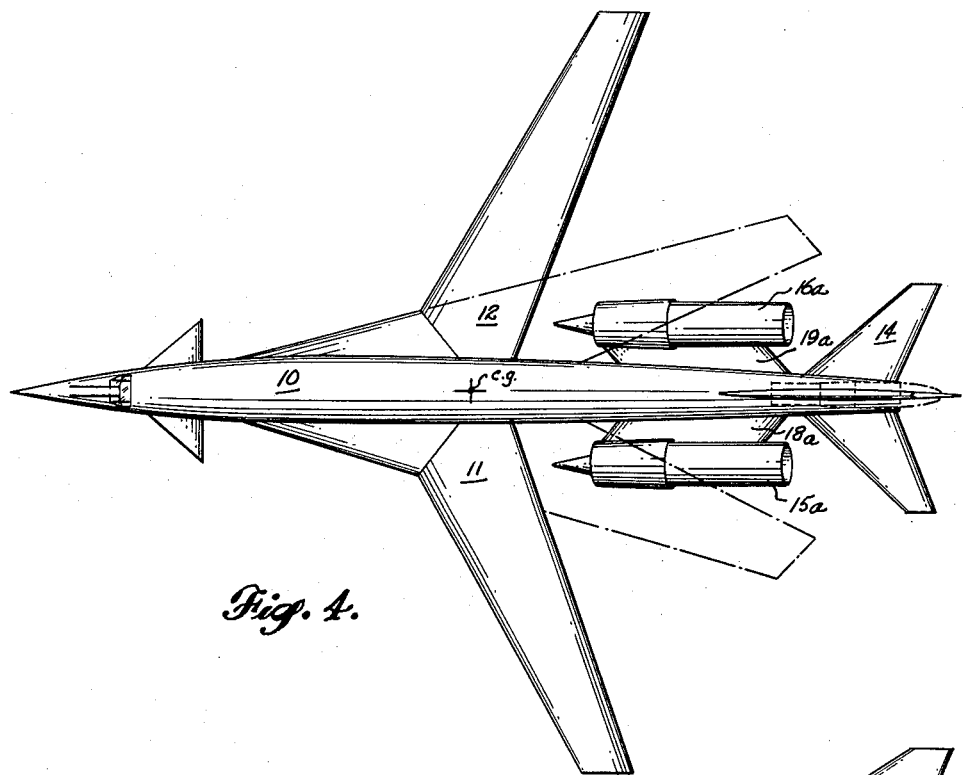
FIG. 4 is a plan view of a modification of the aircraft of FIG. 1 with the aircraft shown in condition for take-off or landing in solid lines and shown in condition for cruise flight in broken lines.
Figure 5:
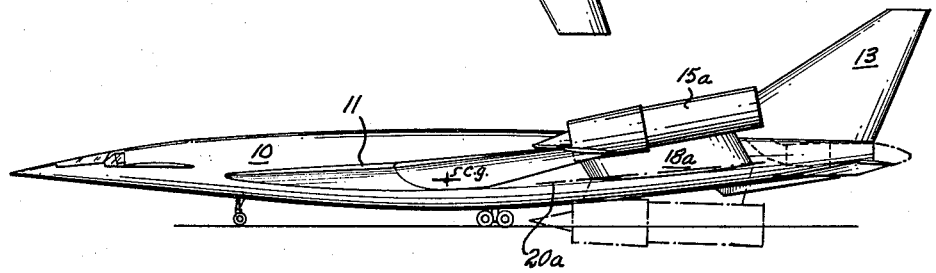
FIG. 5 is a side view of the aircraft of FIG. 4.
Figure 6:
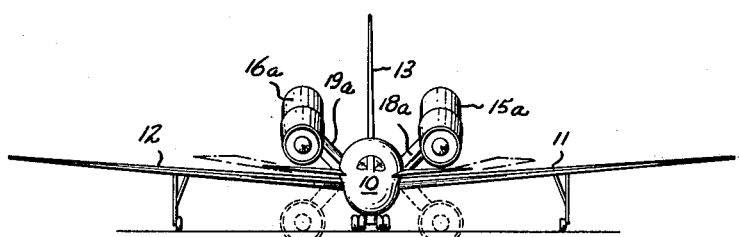
FIG. 6 is a front view of the aircraft of FIG. 4.

FIGS. 4, 5, and 6 illustrate a second embodiment of the invention for carrying out the disclosed method.

In this embodiment each side mounted engine, 15a and 16a is canted upwardly whereby alignment with the airstream or airflow is obtained in the take-off and landing positions. The resulting angle of negative incidence of the engines, as engine 15a for example is produced by the pylon pivot axis 20a being tilted upwardly and rearwardly relative to the aircraft longitudinal axis, as well as engine 15a being tilted a similar angle upwardly and rearwardly relative to pylon pivot axis 20a. In other words the pylon pivot axis for one of the engines, as engine 15a for example, lies in a vertical plane parallel to the vertical plane through the fuselage longitudinal axis, and the forward end of the pivot axis extends downwardly below a horizontal plane through the aft end of the longitudinal axis. Accordingly, upon movement of the engines from the upper or take-off and landing position illustrated in solid lines in FIGS. 5 and 6 to the cruise position illustrated in broken lines in the two figures, the engines, in effect, rotate about both an axis substantially parallel to the aircraft longitudinal axis and an axis adjacent to the wing but parallel to the aircraft transverse axis. The result is an engine substantially in line with the air flow at all attitudes of flight, and an engine, the line of thrust of which is close to or through the aircraft center of gravity, FIG. 5. With the engines in the upper or tilted position, maximum thrust efficiency results during high angle of attack take-offs and landings, and with the engines in the lower position maximum thrust efficiency results at the lower angle of attack or cruise flight attitude.

Operation of the second embodiment of FIGS. 4–6 is similar to that of FIGS. 1–3, with the additional feature of the side mounted engines being rotated in effect, about two axes simultaneously, one axis being parallel to the aircraft longitudinal axis and the other axis being parallel to the aircraft transverse axis to insure maximum thrust efficiency and maximum air intake at all flight attitudes of the aircraft.

FIGS. 4–6 illustrate in solid lines, the aircraft with the engines in the take-off or landing position above the horizontal plane of the wings. Upon cruising speed being reached the engines are then rotated to the lower position or below the level of the plane of the wings.

In both modifications, while the engines are illustrated as being attached to the sides of the fuselage for pivotal movement between the two positions, above and below the plane of the wings, obviously the engines may be attached elsewhere on the aircraft, as on the wings or on the tail, for example, if so desired to accomplish the same positioning of the engines relative to the wings.

Likewise while two engines are shown mounted for pivotal movement between the positions above and below the plane of the wings, if only one engine is utilized, as in a flying or twin boom type of aircraft for example, then obviously only the one engine would be pivotally mounted.

In the disclosed aircraft, the wings are illustrated in solid lines in the fully extended position, FIGS. 1, 3, 4, and 6, for take-offs and for landings, and are illustrated in broken lines in the swept back position, FIGS. 1, 3, 4, and 6, for cruise flight.

In summary, a new method for optimum operation of a supersonic aircraft is disclosed comprising positioning at least one engine above the plane of the wings for takeoffs and landings, and positioning the engine below the plane of the wings for cruise flight. Two embodiments for carrying out the method comprise mounting the engines on pylons that are pivotally mounted on the sides of the aircraft for rotation substantially about the aircraft longitudinal axis, and mounting the engines on pylons that are so pivotally mounted on the aircraft that the engines in effect rotate about both an axis parallel to the aircraft longitudinal axis and an axis parallel to the transverse axis.

The results are maximum consumption of air and thrust efficiency during the three principal modes of flight of supersonic aircraft, the take-off, the cruise portion, and the landing. Likewise long, thin, fragile landing gears are obviated, ingestion free air inlets are provided, the high drag T-tail is obviated, and the engines are operated in the best flow fields.

While a method and only two embodiments of the invention have been shown in the accompanying drawings, it will be evident that various other modifications are possible in the arrangement and construction of the disclosed supersonic aircraft without departing from the scope of the invention.

I claim:
1. An aircraft comprising,
 (a) a fuselage,
 (b) wing means for said fuselage,
 (c) an engine, and
 (d) means for pivotal movement of said engine between a position completely above the plane of said wing means for take-offs and landings and a position completely below the plane of said wing means for greater than Mach 1 cruise flight.
2. An aircraft comprising,
 (a) a fuselage having a longitudinal axis,
 (b) wing means for said fuselage,
 (c) an engine having a longitudinal axis, and
 (d) pivotal mounting means for movably supporting said engine on said fuselage about a pivotal axis, said pivotal mounting means positioning said engine means above the plane of said wing means for take-offs and landings, and said pivotal mounting means positioning said engine means below the plane of said wing means for greater than Mach 1 cruise flight,
 (e) said pivotal axis is parallel to said fuselage longitudinal axis whereby said engine longitudinal axis is maintained parallel to said fuselage longitudinal axis in both positions.
3. An aircraft comprising,
 (a) a fuselage having a longitudinal axis,
 (b) wing means for said fuselage,
 (c) an engine having a longitudinal axis, and
 (d) pivotal mounting means for movably supporting said engine on said fuselage about a pivotal axis, said pivotal mounting means positioning said engine means above the plane of said wing means for take-offs and landings, and said pivotal mounting means positioning said engine means below the plane of said wing means for greater than Mach 1 cruise flight,
 (e) said pivotal axis lies in a vertical plane parallel to the vertical plane through said fuselage longitudinal axis and the forward end of said pivot axis extends downwardly below a horizontal plane through the aft end of the longitudinal axis to maintain the engine longitudinal axis contiguous with the aircraft center of gravity for maximum efficiency of thrust.
4. An aircraft comprising,
 (a) a fuselage,
 (b) a wing mounted on said fuselage,
 (c) an engine,
 (d) pylon means on said fuselage for movably supporting said engine, and
 (e) actuator means connected between said pylon means and said fuselage, said pylon means being responsive to said actuator means for positioning said engine totally above the plane of said wing for take-offs and landings, and for positioning said engine totally below the plane of said wing for cruise flight.
5. A supersonic aircraft comprising,
 (a) a fuselage,
 (b) a wing mounted on said fuselage,
 (c) an elongated engine pylon, one end of said pylon being pivotally connected to said fuselage,
 (d) an engine, said engine mounted on the other end of said pylon, and
 (e) an actuator connected between said pylon and said fuselage for moving said pylon and accordingly positioning said engine above the plane of said wing for slow flight and for positioning said engine below the plane of said wing for fast flight.
6. An aircraft comprising,
 (a) a fuselage,
 (b) swept wings mounted on said fuselage,
 (c) a plurality of engine pylons, one end of each pylon being pivotally connected to said fuselage,
 (d) a plurality of engines, an engine being mounted on the other end of each of said pylons, and
 (e) a plurality of actuators, an actuator being connected between a pylon and said fuselage for positioning said engines above the plane of said wings for take-offs and landings and below the plane of said wings for cruise flight.

References Cited by the Examiner

UNITED STATES PATENTS

| | | | |
|---|---|---|---|
| 1,714,416 | 5/29 | Cannistra | 244—56 X |
| 1,752,012 | 3/30 | Lauchin | 244—56 |
| 1,806,680 | 5/31 | Hamilton | 244—55 |
| 2,863,620 | 12/58 | Vautier | 244—15 |
| 2,971,725 | 2/61 | Jakimiuk | 244—56 X |
| 2,973,166 | 2/61 | Stahmer | 244—23 |
| 3,047,255 | 7/62 | Wallis | 244—55 |

FOREIGN PATENTS

| | | |
|---|---|---|
| 690,450 | 6/30 | France. |
| 169,408 | 9/21 | Great Britain. |
| 851,916 | 10/60 | Great Britain. |
| 341,993 | 10/21 | Germany. |
| 961,151 | 4/57 | Germany. |

FERGUS S. MIDDLETON, *Primary Examiner.*

ANDREW H. FARRELL, MILTON BUCHLER,
*Examiners.*